United States Patent
Kwon et al.

(10) Patent No.: US 12,067,421 B2
(45) Date of Patent: Aug. 20, 2024

(54) ADVANCED MEMORY TRACKING FOR KERNEL MODE DRIVERS

(71) Applicant: Microsoft Technology Licensing, LLC, Redmond, WA (US)

(72) Inventors: Hyuk Joon Kwon, Redmond, WA (US); Sandeep Repaka, Issaquah, WA (US); Andrew M. Kluemke, Seattle, WA (US); Jakob F. Lichtenberg, Redmond, WA (US); Sebastian Lerner, Seattle, WA (US); Matthew John Woolman, Seattle, WA (US); Swati Kanchan, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 312 days.

(21) Appl. No.: 17/192,546

(22) Filed: Mar. 4, 2021

(65) Prior Publication Data
US 2022/0283864 A1    Sep. 8, 2022

(51) Int. Cl.
*G06F 9/50* (2006.01)
*G06F 11/30* (2006.01)
*G06F 11/34* (2006.01)

(52) U.S. Cl.
CPC ........ *G06F 9/5016* (2013.01); *G06F 11/3037* (2013.01); *G06F 11/3442* (2013.01)

(58) Field of Classification Search
CPC ............ G06F 9/5016; G06F 11/3037; G06F 11/3442; G06F 11/073; G06F 11/0751; G06F 11/3466; G06F 2209/508; G06F 2209/542; G06F 9/5022; G06F 11/3471
See application file for complete search history.

(56) References Cited

U.S. PATENT DOCUMENTS

| | | | |
|---|---|---|---|
| 6,728,907 B1 * | 4/2004 | Wang .................. | G06F 11/073 714/48 |
| 7,111,307 B1 | 9/2006 | Wang | |
| 7,487,321 B2 | 2/2009 | Muthiah et al. | |
| 7,669,030 B2 | 2/2010 | Chittigala | |
| 8,060,543 B1 * | 11/2011 | Ciot .................. | G06F 11/3616 707/820 |
| 10,649,889 B2 | 5/2020 | Desai et al. | |
| 10,846,211 B2 | 11/2020 | Bond et al. | |
| 2007/0209032 A1 * | 9/2007 | Mihai ............ | G01R 31/318371 717/126 |

(Continued)

OTHER PUBLICATIONS

"How to Detect a Kernel-Mode Memory Leak in Windows Kernel Drivers with Application and Change Control", Retrieved from: https://kc.mcafee.com/corporate/index?page=content&id=KB85956 &locale=en_US, Retrieved Date: Dec. 12, 2020, 4 Pages.

(Continued)

*Primary Examiner* — Jorge A Chu Joy-Davila
(74) *Attorney, Agent, or Firm* — ArentFox Schiff LLP (57) ABSTRACT

Described are examples for tracking memory usage of a driver. A memory allocation request related to the driver to allocate a portion of memory for the driver can be traced in a kernel mode of an operating system. One or more associated allocation parameters can be recorded, and an allocation history of the driver over a period of time can be reported during execution of the driver and based on the one or more allocation parameters indicated by the memory allocation request.

18 Claims, 5 Drawing Sheets

(56) References Cited

U.S. PATENT DOCUMENTS

2009/0328007 A1 12/2009 Chen et al.
2014/0129793 A1 5/2014 Crosby et al.
2021/0019200 A1 1/2021 Niles et al.

OTHER PUBLICATIONS

"Kernel Memory Leak Detector", Retrieved from: https://web.archive.org/web/20200307065205/https:/www.kernel.org/doc/html/latest/dev-tools/kmemleak.html, Mar. 7, 2020, 8 pages.
Gayhardt, et al., "Memory Leak Detection (Preview)", https://docs.microsoft.com/en-us/azure/azure-monitor/app/proactive-potential-memory-leak, Dec. 12, 2017, 2 Pages.
"International Search Report & Written Opinion issued in PCT Application No. PCT/US22/017440", Mailed Date: May 18, 2022, 13 Pages.

* cited by examiner

ADVANCED MEMORY TRACKING FOR KERNEL MODE DRIVERS

BACKGROUND

Computing systems include an operating systems for interfacing with hardware and various devices of the computing system. The operating system provides an interface for applications to execute and use the hardware and various devices of the computing system for specific purposes. The hardware can include a processor, memory, bus for communicating between the processor and memory and/or among the various devices of the computing system, etc. The various devices can include input/output devices, such as cameras, touchscreens or other displays, etc., storage devices, and/or the like. The operating system can execute on the computing system and can operate in a kernel mode separate from various applications executing on the computing system. In the kernel mode, the operating system can execute drivers that facilitate communicating with various components of the computing system, such as the hardware, various devices, etc. When the operating system executes (e.g., boots up), drivers can be loaded or initialized and execute in the kernel mode to provide an interface to communicate with hardware or various devices, which can include receiving requests for data related to the hardware or various devices, and providing responses thereto. Tools have been developed to determine total memory usage of a driver once a driver is unloaded from memory. The driver can unload as part of a sequence to unload or shut down the operating system, when the corresponding hardware or device is disconnected from the computing system, etc. In some implementations, such as for a computing system functioning as a server, the driver may not be unloaded frequently, and as such, legacy tools may not provide a reliable mechanism for determining memory usage or memory leaking by the driver.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a computer-implemented method for tracking memory usage of a driver is provided. The method includes tracing, in a kernel mode of an operating system, a memory allocation request related to the driver to allocate a portion of memory for the driver, recording, based on tracing the memory allocation request, one or more allocation parameters indicated by the memory allocation request, and reporting, during execution of the driver and based on the one or more allocation parameters indicated by the memory allocation request, an allocation history of the driver over a period of time.

In another example, a device for tracking memory usage of a driver is provided that includes a memory storing one or more parameters or instructions for executing an operating system and the driver that facilitates communicating with hardware or other devices, and at least one processor coupled to the memory. The at least one processor is configured to trace, in a kernel mode of the operating system, a memory allocation request related to the driver to allocate a portion of memory for the driver, record, based on tracing the memory allocation request, one or more allocation parameters indicated by the memory allocation request, and report, during execution of the driver and based on the one or more allocation parameters indicated by the memory allocation request, an allocation history of the driver over a period of time.

In another example, a computer-readable medium including code executable by one or more processors for tracking memory usage of a driver is provided. The code includes code for tracing, in a kernel mode of an operating system, a memory allocation request related to the driver to allocate a portion of memory for the driver, recording, based on tracing the memory allocation request, one or more allocation parameters indicated by the memory allocation request, and reporting, during execution of the driver and based on the one or more allocation parameters indicated by the memory allocation request, an allocation history of the driver over a period of time.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to advanced memory tracking for kernel mode drivers. In an example, an advanced pool tracking (APT) tool can execute on an operating system to intercept or trace memory stack allocation requests from one or more kernel mode drivers to determine parameters related to the requests, such as a kernel mode driver making the request, an amount of memory requested in the request, etc. In another example, the APT tool can also report, or provide an interface for reporting or providing, the parameters related to the requests, other computed parameters related to the requests, such as a count of a number of allocations made by a kernel mode driver, the total amount of memory allocated by the kernel mode driver, etc. In addition, in an example, the APT tool can also intercept or trace memory free actions related to the kernel mode driver (which may be performed by a memory pool manager of the operating system), where the memory free action can relate to deallocating the previously allocated memory. In an example, the APT tool can similarly determine parameters related to memory freeing, and can report, or provide an interface for reporting or providing, parameters related to the memory freeing, such as a count of a number of memory frees for the kernel mode driver, an amount of memory freed for the kernel mode driver, a difference between an amount of memory allocated and an amount of memory freed for the kernel mode driver, etc.

In addition, in an example, the APT tool can provide this information as related to a period of time of executing the kernel mode driver, such as a time from initializing the kernel mode driver until a current time. In another example, the APT tool can take snapshots of the information for certain periods of time, such as every day (e.g., every 24 hours), a certain number of days, a certain number of minutes, etc., by determining the information of allocation requests and frees during the periods of time. The snapshots can be used, e.g., by a system administrator or a computing system, to determine patterns of memory usage for detecting potential memory leaks by the kernel mode driver. Aspects described herein improve memory usage tracking and leak detection by allowing reporting of the allocation, frees, potential leaks, etc. while the kernel mode driver is executing and without having to wait for the kernel mode driver to unload. In addition, where the APT tool provides the snapshot functionality, this can prevent detecting false positives of memory leaks by viewing the memory consumption over multiple periods of time to determine if there is a pattern of continuous memory increase without freeing, which may be indicative of a memory leak.

Figure 1:
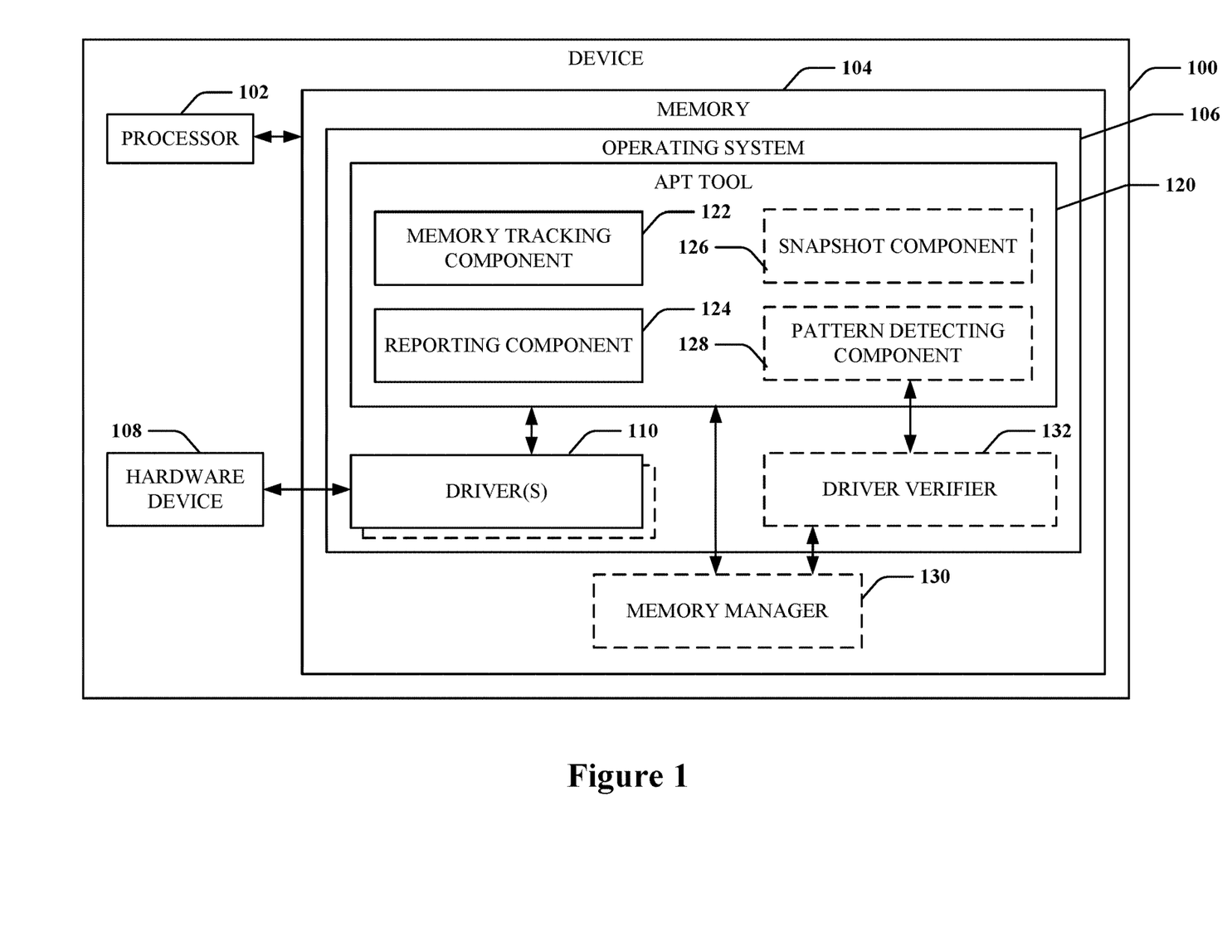
FIG. 1 is a schematic diagram of an example of a device for tracking memory usage of kernel mode drivers during execution of the kernel mode drivers, in accordance with aspects described herein.
Figure 2:
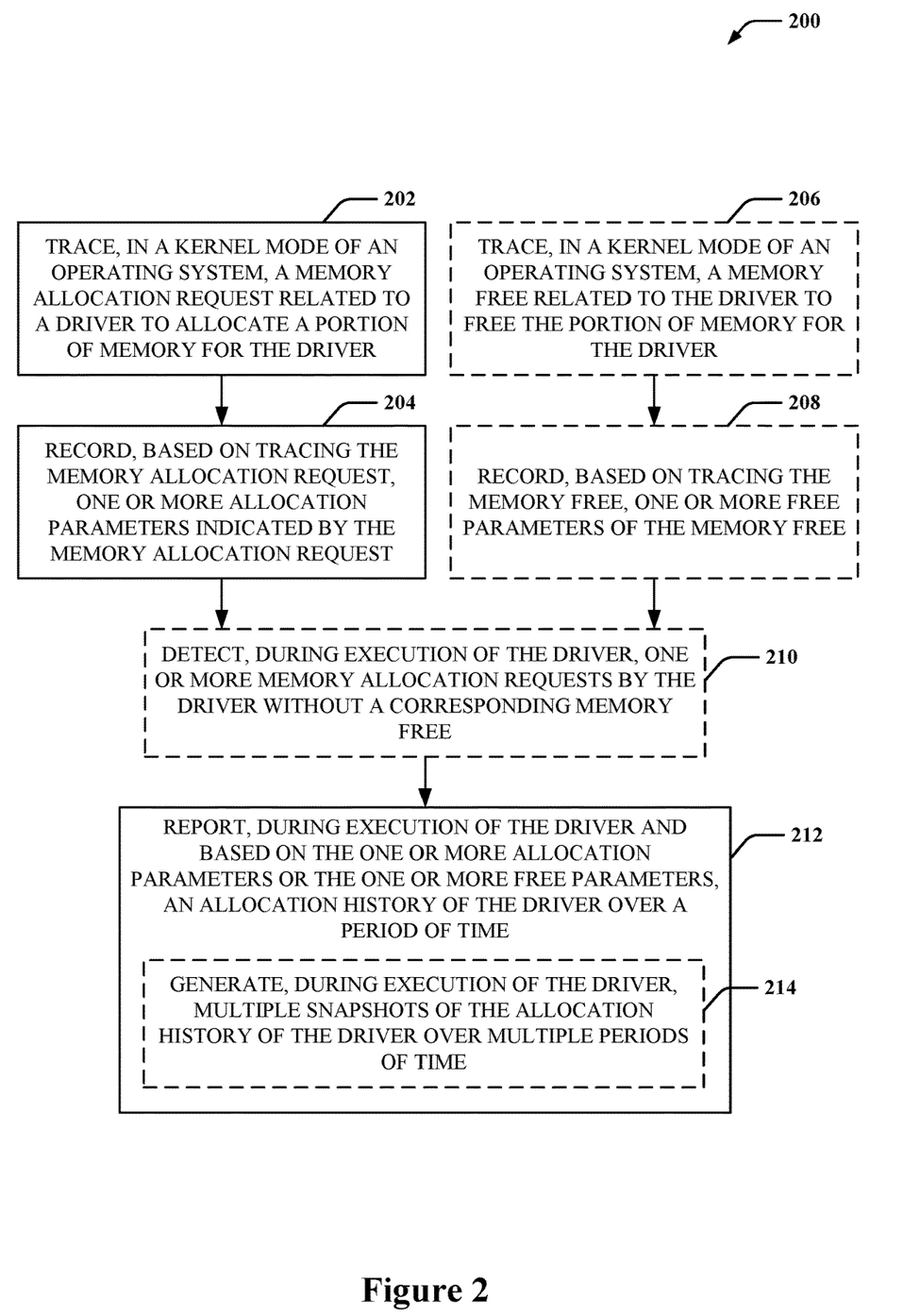
FIG. 2 is a flow diagram of an example of a method for performing memory tracking for one or more kernel mode drivers, in accordance with aspects described herein.
Figure 3:
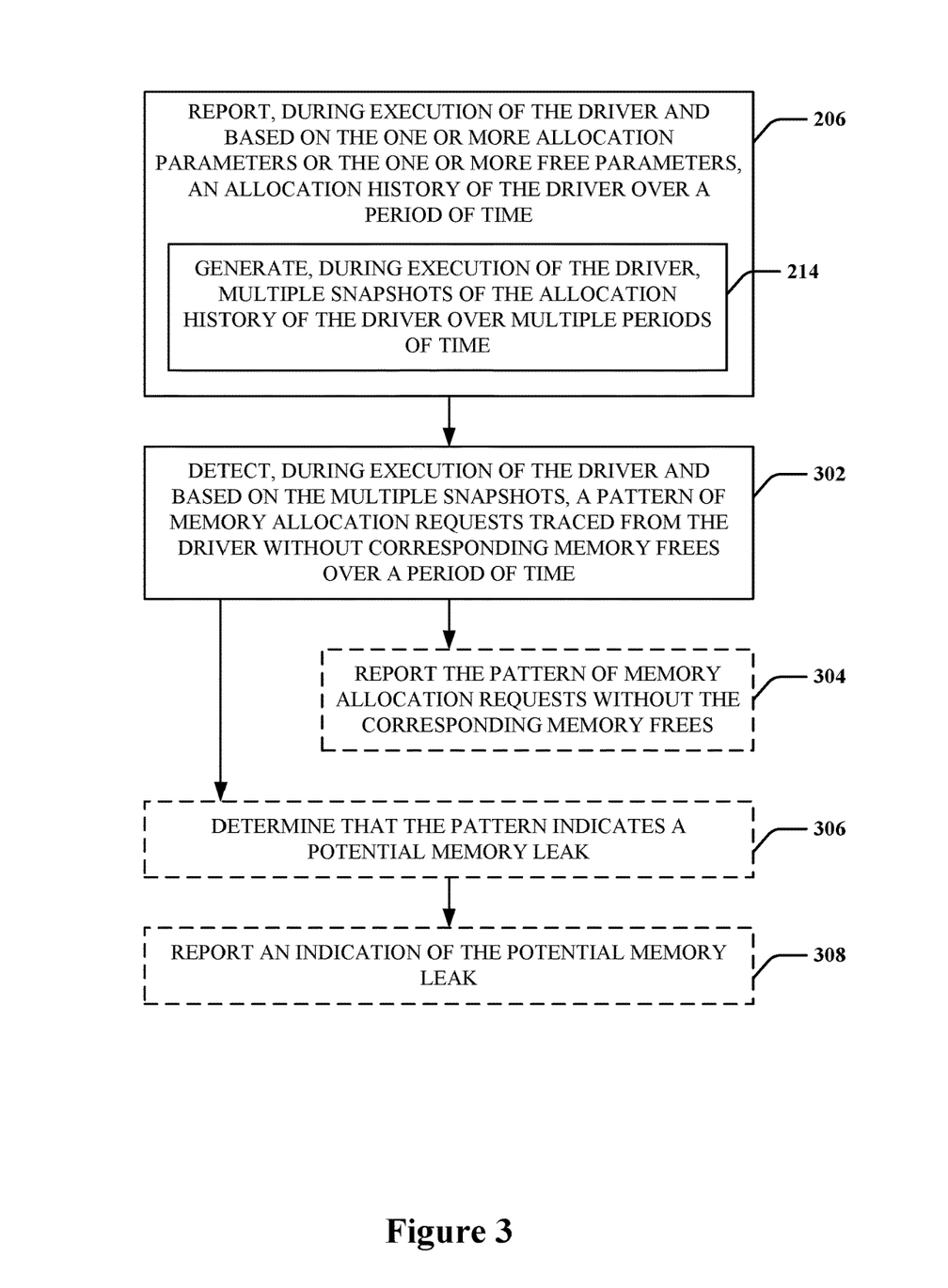
FIG. 3 is a flow diagram of an example of a method for identifying patterns of memory allocation without corresponding memory frees, in accordance with aspects described herein.

Turning now to FIGS. 1-5, examples are depicted with reference to one or more components and one or more methods that may perform the actions or operations described herein, where components and/or actions/operations in dashed line may be optional. Although the operations described below in FIGS. 2-3 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 (e.g., a computing device) for tracking memory usage of kernel mode drivers during execution of the kernel mode drivers. In an example, device 100 can include a processor 102 and/or memory 104 configured to execute or store instructions or other parameters related to providing an operating system 106, which can execute one or more applications or processes, such as, but not limited to, an APT tool 120, a driver 110, a memory manager 130, a driver verifier 132, and/or the like, as described further herein. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component), and/or the like. Memory 104 may store instructions, parameters, data structures, etc. for use/execution by processor 102 to perform functions described herein.

Device 100 can also include one or more hardware devices 108, which may include devices related to operation of the device 100, such as an interface card or chip (e.g., display interface card, network interface card, audio interface card, universal serial bus card, etc.), for enabling input/output of data to/from the device 100 (and/or associated processor 102, memory 104, etc.) via one or more buses or other interfaces. For example, hardware device 108 may be coupled to the device 100 via a slot, port, or other interface for communicating within the device 100 via a bus. In any case, operating system 106 can communicate with the hardware device 108 via one or more drivers 110 to facilitate communicating data to/from the hardware device 108, instructing the hardware device 108 with one or more parameters, commands, etc. for operation, and/or the like.

For example, operating system 106 can load and operate the driver(s) 110 to facilitate communicating with the hardware device 108 or other devices. As such, a driver 110 can execute via processor 102 and/or instructions stored in memory 104 and may access components of the device 100, such as memory 104, to operate and provide certain functionality, such as communicating with hardware device 108 or other devices. In some examples, driver(s) 110 can operate to facilitate communicate data to/from other parts of the device 100, such as processor 102, memory 104, a bus, other hardware that may or may not include peripheral devices, etc. In an example, operating system 106 can load the driver(s) 110 as part of a system initialization process based on starting or booting up the operating system 106, based on detecting presence of the corresponding hardware device, based on request from an application or other operating system 106 service or executable, etc. In some examples, the operating system 106 can unload the driver(s) 110 as part of shutting down the operating system 106, based on detecting removal or lack of presence of the hardware device, based on a request from an application or other operating system 106 service or executable, etc.

In an example, operating system 106 can also provide or execute a memory manager 130 for managing allocation and deallocation of memory 104 to services of the operating system 106, applications, and/or the like. For example, memory manager 130 can obtain requests to allocate memory and can provide memory allocations as requested and/or based on other considerations (e.g., an amount of memory available), etc. In another example, memory manager 130 can deallocate memory from the services of the operating system 106, applications, and/or the like, which can be based on a deallocation request, termination of the application or service, etc. In another example, operating system 106 may provide or execute a driver verifier 132 for monitoring interactions between the operating system 106 and driver(s) 110. For example, the driver verifier 132 can instrument code of the driver 110 to intercept or trace certain function calls (e.g., application programming interface (API) calls. In one example, the driver verifier 132 can modify function calls in an import address table (IAT) to redirect functions called by the driver 110 to other similar functions that allow for intercepting or tracing the original function calls. In examples described herein, at least for one or more kernel mode drivers 110, driver verifier 132 can redirect memory allocation functions called by the one or more kernel mode drivers 110 to similar functions that allow for recording parameters received as part of the function call, such as an identifier of the kernel mode driver 110 calling the function, an amount of memory requested to be allocated (or that is allocated on return of the function), etc.

Operating system 106 can also provide or execute an APT tool 120 that can track memory used by one or more drivers 110, as described herein. APT tool 120 can include a memory tracking component 122 for tracking memory allocation requests for a driver 110 and/or memory frees for the driver 110, and/or a reporting component 124 for recording and/or reporting information regarding the memory allocation requests and/or the memory frees for the driver 110, such as an allocation history for the driver 110 over a period of time, which may include a number of allocation requests, an amount of allocated memory, a number of memory frees, an amount of memory freed, a total amount of memory allocated and not freed, etc. for the driver 110 over the period of time. APT tool 120 can optionally include a snapshot component 126 for recording multiple reports of memory information for a driver 110 over multiple periods of time (e.g., memory allocation history for the driver 110 over multiple periods of time), and/or a pattern detecting component 128 for analyzing the snapshots in an attempt to detect a pattern of memory allocation history that may be indicative of a potential memory leak.

FIG. 2 is a flowchart of an example of a method 200 for performing memory tracking for one or more kernel mode drivers. For example, method 200 can be performed by a device 100 and/or one or more components thereof to facilitate tracking memory usage, or related information, for the one or more kernel mode drivers.

In method 200, at action 202, a memory allocation request related to a driver to allocate a portion of memory for the driver can be traced in a kernel mode of an operating system. In an example, memory tracking component 122 of an APT tool 120, e.g., in conjunction with processor 102, memory 104, operating system 106, etc., can trace, in the kernel mode of the operating system (e.g., operating system 106), the memory allocation request related to the driver (e.g., driver 110) to allocate the portion of memory for the driver. In an example, memory tracking component 122 of the APT tool 120 can track substantially any memory information related to the driver by tracing certain requests or commands made in the kernel by the driver 110, by memory manager 130, and/or the like, as described further herein. In addition, the allocations can relate to pool allocations from a pool of memory 104.

In one example, memory tracking component 122 can receive the memory information from a driver verifier 132, which can intercept certain function calls made by the driver 110. For example, driver verifier 132 can modify function calls in a IAT to call alternative functions that allow driver verifier 132 to collect information from the function calls. In a specific example, driver verifier 132 can modify function calls (e.g., API calls) in the IAT that relate to memory allocation by changing the function calls to call an alternative memory allocation function (e.g., an alternative API call) that can similarly request memory allocation, but can also log certain information of the function call, such as an amount of memory requested, an identifier of a process requesting the memory allocation, etc. In an example, both the memory allocation function and the alternative (or supplemented) memory allocation function may be provided by a kernel process of the operating system 106.

In addition, the driver verifier 132 may modify function calls for each process, or in some examples, where the IAT includes process information, driver verifier 132 may modify function calls for only certain processes (e.g., for only kernel mode drivers 110). In this regard, in one example, memory tracking component 122 can indicate, to the driver verifier 132, the drivers 110 for which to intercept function calls to collect the memory information. In other examples, memory tracking component 122 can receive memory allocation request information from the driver verifier 132 for all memory allocation requests in the IAT, and memory tracking component 122 can filter the information for information regarding one or more specific kernel mode drivers 110. Moreover, in an example, memory tracking component 122 can determine which drivers 110 to monitor including all kernel mode drivers, including certain drivers indicated for monitoring (e.g., indicated by selection via a user interface), etc.

In other examples, memory tracking component 122 can use substantially any mechanism for tracing memory allocation requests or otherwise collecting memory allocation information for a driver 110. This may include not just using a driver verifier 132 as described herein, but may include instrumenting code of the driver 110 to report or log memory allocation information, instrumenting code of the driver 110 to call the alternative memory allocation requests that allow for collecting the memory allocation information, as described above, etc.

In method 200, at action 204, one or more allocation parameters indicated by the memory allocation request can be recorded based on tracing the memory allocation request. In an example, memory tracking component 122 of the APT tool 120, e.g., in conjunction with processor 102, memory 104, operating system 106, etc., can record, based on tracing the memory allocation request, the one or more allocation parameters indicated by the memory allocation request. For example, memory tracking component 122 can record (e.g., in memory 104, for later consumption) an amount of memory indicated in the memory allocation request, an address of the memory allocated based on the memory allocation request, an identifier of the process (e.g., of the driver 110) making the memory allocation request, etc.

In some examples, memory tracking component 122 can record or update other information based on the one or more allocation parameters indicated by the memory allocation requests, such as a number of allocations made by the driver 110 (e.g., by incrementing the number of allocations based on tracing the memory allocation request), an amount of memory allocated by the driver 110 (e.g., by adding the amount of memory indicated in the memory allocation request to a total allocation amount stored for the driver 110), etc. In addition, as described in examples herein, some such information may be stored for a given period of time (e.g., as a snapshot), and the number of allocations, amount of memory allocated, etc., can be updated based on whether the traced memory allocation request is within the given period of time. In some examples, memory tracking component 122 can record this information in different variables for different periods of time. In other examples, memory tracking component 122 can store the one or more memory allocation parameters along with a timestamp or other time-related information, and the other information can be computed based on request for a specific period of time.

In method 200, optionally at action 206, a memory free related to the driver to free the portion of memory for the driver can be traced in the kernel mode of the operating system. In an example, memory tracking component 122 of an APT tool 120, e.g., in conjunction with processor 102, memory 104, operating system 106, etc., can trace, in the kernel mode of the operating system (e.g., operating system 106), the memory free related to the driver (e.g., driver 110) to free the portion of memory (or substantially any portion of memory) for the driver. In an example, memory tracking component 122 of the APT tool 120 can track the memory free tracing certain requests or commands made in the kernel by the driver 110, by memory manager 130, and/or the like, as described further herein. In addition, the frees can relate to pool frees from a pool of memory 104 by the memory manager 130. Moreover, for example, a unique stack in memory 104 can be used for pool allocations and frees for a driver 110 due to frequent operations.

In one example, as described, memory tracking component 122 can receive the memory information from a driver verifier 132, which can intercept certain function calls made by the driver 110. For example, driver verifier 132 can modify function calls in a IAT to call alternative functions that allow driver verifier 132 to collect information from the function calls. In a specific example, driver verifier 132 can modify function calls (e.g., API calls) in the IAT that relate to memory freeing by changing the function calls to call an alternative memory free function (e.g., an alternative API call) that can similarly request memory freeing, but can also log certain information of the function call, such as an amount of memory to be freed, an identifier of a process requesting the memory freeing, etc. In an example, both the memory free function and the alternative (or supplemented) memory free function may be provided by a kernel process of the operating system 106.

In another example, the memory manager 130 may actually free the memory for the driver 110. For example, driver 110 can request memory freeing, but the memory may not actually be freed until the memory manager 130 frees the memory. Thus, in an example, driver verifier 132 can intercept calls made by the memory manager 130 to free the memory. As described, in this example, driver verifier 132 may, at least for certain memory free calls related to a specific driver 110, replace the memory free function called by the memory manager 130 with an alternative memory free function that allows for recording memory free parameters.

In other examples, memory tracking component 122 can use substantially any mechanism for tracing memory frees or otherwise collecting memory free (e.g., deallocation) information for a driver 110. This may include not just using a driver verifier 132 as described herein, but may include instrumenting code of the driver 110 to report or log memory free information, instrumenting code of the driver 110 to call the alternative memory free requests that allow for collecting the memory free information, as described above, etc.

In method 200, optionally at action 208, one or more free parameters indicated by the memory free can be recorded based on tracing the memory free. In an example, memory tracking component 122 of the APT tool 120, e.g., in conjunction with processor 102, memory 104, operating system 106, etc., can record, based on tracing the memory free, the one or more free parameters indicated by the memory free. For example, memory tracking component 122 can record (e.g., in memory 104, for later consumption) an amount of memory indicated in the memory free, an address associated with the memory free, an identifier of the process (e.g., of the driver 110) making the memory allocation request, etc.

In some examples, memory tracking component 122 can record or update other information based on the one or more free parameters indicated by the memory frees, such as a number of frees for the driver 110 (e.g., by incrementing the number of frees based on tracing the memory free), an amount of memory freed for the driver 110 (e.g., by adding the amount of memory indicated in the memory free to a total free amount stored for the driver 110), etc. In addition, as described in examples herein, some such information may be stored for a given period of time (e.g., as a snapshot), and the number of frees, amount of memory freed, etc., can be updated based on whether the traced memory free is within the given period of time. In some examples, memory tracking component 122 can record this information in different variables for different periods of time. In other examples, memory tracking component 122 can store the one or more free parameters along with a timestamp or other time-related information, and the other information can be computed based on request for a specific period of time.

In addition, where both memory allocation parameters and memory free parameters are recorded, memory tracking component 122 can record or compute other allocation parameters as well. For example, memory tracking component 122 can determine a total amount of memory outstanding (or in use) by the driver 110, taking into account a total amount of memory allocation and subtracting a total amount of memory freed over the period of time. In another example, memory tracking component 122 can determine a differential between a total number of memory allocation requests and a total number of memory frees for the driver 110. In addition, in an example, a Adelson-Velsky and Landis (AVL) tree can be used to store the one or more allocation parameters or free parameters, to facilitate quick insertion, lookup, update of the allocation history data.

In one example of method 200, optionally at action 210, one or more memory allocation requests by the driver without a corresponding memory free can be detected. In an example, memory tracking component 122 of the APT tool 120, e.g., in conjunction with processor 102, memory 104, operating system 106, etc., can detect, during execution of the driver, the one or more memory allocation requests by the driver without the corresponding memory free. For example, memory tracking component 122 can match a traced memory free (or parameters thereof) with a traced memory allocation request (or parameters thereof) for the driver 110. In an example, the one or more free parameters from the memory free may include information that allows for matching the memory free with a memory allocation request, such as an identifier of the driver 110, a memory address associated with the memory free, an amount of memory associated with the memory free, etc. Based on this information memory tracking component 122 can attempt to match the memory free with a memory allocation request for the driver 110. One or more memory allocation requests that do not have a corresponding memory free can be detected over a period of time and/or reported for subsequent analysis or potential leak identification. In some examples, however, it may not be possible to match (or to exactly match) the memory free to a memory allocation request, which may depend on the one or more free parameters provided.

In method 200, at action 212, an allocation history of the driver over a period of time can be reported during execution of the driver and based on the one or more allocation parameters or the one or more free parameters. In an example, reporting component 124 of the APT tool 120, e.g., in conjunction with processor 102, memory 104, operating system 106, etc., can report, during execution of the driver (e.g., driver 110) and based on the one or more allocation parameters or the one or more free parameters, the allocation history of the driver over the period of time. For example, using the tracing functionality described herein, memory allocation and/or freeing can be tracked as the driver 110 is in operation, and reporting can also occur while the driver 110 is in operation, which can improve driver diagnostics by not requiring the driver 110 to unload before memory usage information can be obtained and analyzed. Indeed, waiting for the driver 110 to unload may not provide as detailed of memory information as tracing the memory allocation requests and/or memory frees, as described herein.

In an example, the allocation history of the driver 110 may include one or more of the memory information parameters described above, such as a total number of allocations, a total amount of memory allocated, a total number of memory frees, a total amount of memory freed, a total amount of memory outstanding (considering the total amount of memory allocated and subtracting the total amount of memory freed), etc. for the driver 110. In an example, reporting component 124 can report the allocation history of the driver 110 based on, or in response to, a command or function call received from an interface (e.g., from an application executing on the operating system 106, from a user interface provided by the application, etc.). In an example, APT tool 120 can have or can communicate with an interface for reporting the allocation history. In an example, reporting component 124 can report additional information, such as whether the memory that has been allocated and/or freed for the driver 110 is paged or not paged, stack information of the memory stack used to allocate memory to, or free memory from, the driver 110, etc. In an example, the various allocation history information can assist a developer in tracking down potential memory leaks and/or can be used by an automatic process to potential identify memory leaks in a driver 110, as described further herein.

In an example, as described, APT tool 120 can allow for requesting the allocation history for a driver 110 or for querying for allocation history for the driver 110. Thus, in an example, APT tool 120 can store the allocation parameters and/or free parameters for generating allocation history in response to query requests. In another example, reporting component 124 can store the allocation history for the driver 110 for certain time periods, where the allocation history can be provided in response to a request for allocation history of the driver 110 in a given time period (which may include from driver loading until a current time).

In this regard, in an example, in reporting the allocation history at action 212, optionally at action 214, multiple snapshots of the allocation history of the driver over multiple periods of time can be generated during execution of the driver. In an example, snapshot component 126 of the APT tool 120, e.g., in conjunction with processor 102, memory 104, operating system 106, reporting component 124, etc., can generate, during execution of the driver (e.g., driver 110), the multiple snapshots of the allocation history of the driver over the multiple periods of time. For example, snapshot component 126 can generate a snapshot upon a query for allocation history for a period of time, which may include snapshot component 126 accumulating data from the memory allocation parameters and/or free parameters received over the period of time for the driver 110, as described. In another example, snapshot component 126 can generate the snapshots automatically at certain periods of time (e.g., each day, each number of days, each hour or number of hours, etc.) by accumulating data from the memory allocation parameters and/or free parameters received over the period of time for the driver 110, as described.

FIG. 3 is a flowchart of an example of a method 300 for identifying patterns of memory allocation without corresponding memory frees. For example, method 300 can be performed by a device 100 and/or one or more components thereof to facilitate determining and/or reporting the patterns or associated potential memory leaks.

In an example, method 300 can be performed in conjunction with method 200. As shown, for example, method 300 can include action 206 described in method 200 of reporting, during execution of the driver and based on the one or more allocation parameters or the one or more free parameters, the allocation history of the driver over the period of time, which may include, at action 214, generating, during execution of the driver, the multiple snapshots of the allocation history of the driver over multiple periods of time.

In method 300, at action 302, a pattern of memory allocation requests traced from the driver without corresponding memory frees over a period of time can be detected during execution of the driver and based on the multiple snapshots. In an example, pattern detecting component 128 of the APT tool 120, e.g., in conjunction with processor 102, memory 104, operating system 106, reporting component 124, etc., can detect, during execution of the driver (e.g., driver 110) and based on the multiple snapshots, a pattern of memory allocation requests traced from the driver without corresponding memory frees over a period of time. For example, pattern detecting component 128 can request generation of the snapshots over the periods of time, which reporting component 124 can fulfill and respond as described above, or can request known snapshot intervals that reporting component 124 has automatically generated. In either case, pattern detecting component 128 can obtain the allocation history for the driver 110 in and over multiple periods of time. In another example, pattern detecting component 128 can use this information to detect certain patterns of memory allocation by the driver 110, which can include detecting patterns corresponding to potential memory leaks, patterns corresponding to desirable/permissible memory allocation and freeing, etc.

In one example, in method 300, optionally at action 304, the pattern of memory allocation requests without the corresponding memory frees can be reported. In an example, reporting component 124 of the APT tool 120, e.g., in conjunction with processor 102, memory 104, operating system 106, etc., can report the pattern of memory allocation requests without the corresponding memory frees. For example, reporting component 124 can report, e.g., via an interface on an application or APT tool 120, an indication of the pattern, which may include a report of outstanding memory for the driver 110 over and in certain periods of time (e.g., a report showing a pattern of memory outstanding to the driver 110 at each of multiple periods of time).

In another example, in method 300, optionally at action 306, it can be determined that the pattern indicates a potential memory leak. In an example, pattern detecting component 128 of the APT tool 120, e.g., in conjunction with processor 102, memory 104, operating system 106, etc., can determine that the pattern indicates a potential memory leak. For example, pattern detecting component 128 can determine a total amount of outstanding memory generated for snapshots over a number of days (or other periods of time). Where pattern detecting component 128 determines that the total amount of outstanding memory continues to increase over the number of days (e.g., over a threshold amount of increase from day-to-day), pattern detecting component 128 may determine that this pattern may be indicative of a potential memory leak. In another example, pattern detecting component 128 can input the pattern to a neural network to obtain an output of a confirmation or likelihood that the pattern indicates a memory leak (e.g., by comparing the pattern to patterns known in the neural network to indicate—or not indicate—a memory leak).

In an example, in method 300, optionally at action 308, an indication of the potential memory leak can be reported. In an example, reporting component 124 of the APT tool 120, e.g., in conjunction with processor 102, memory 104, operating system 106, etc., can report the indication of the potential memory leak, whether determined based on detecting a pattern of increasing outstanding memory over multiple periods of time, determined by output from a neural network, etc. For example, reporting component 124 can report, e.g., via an interface on an application or APT tool 120, an indication of the potential memory leak along with relevant allocation history information (e.g., total outstanding memory over the periods of time, memory identification information such as memory address of outstanding memory, an identifier of the driver 110, etc.).

Figure 4:
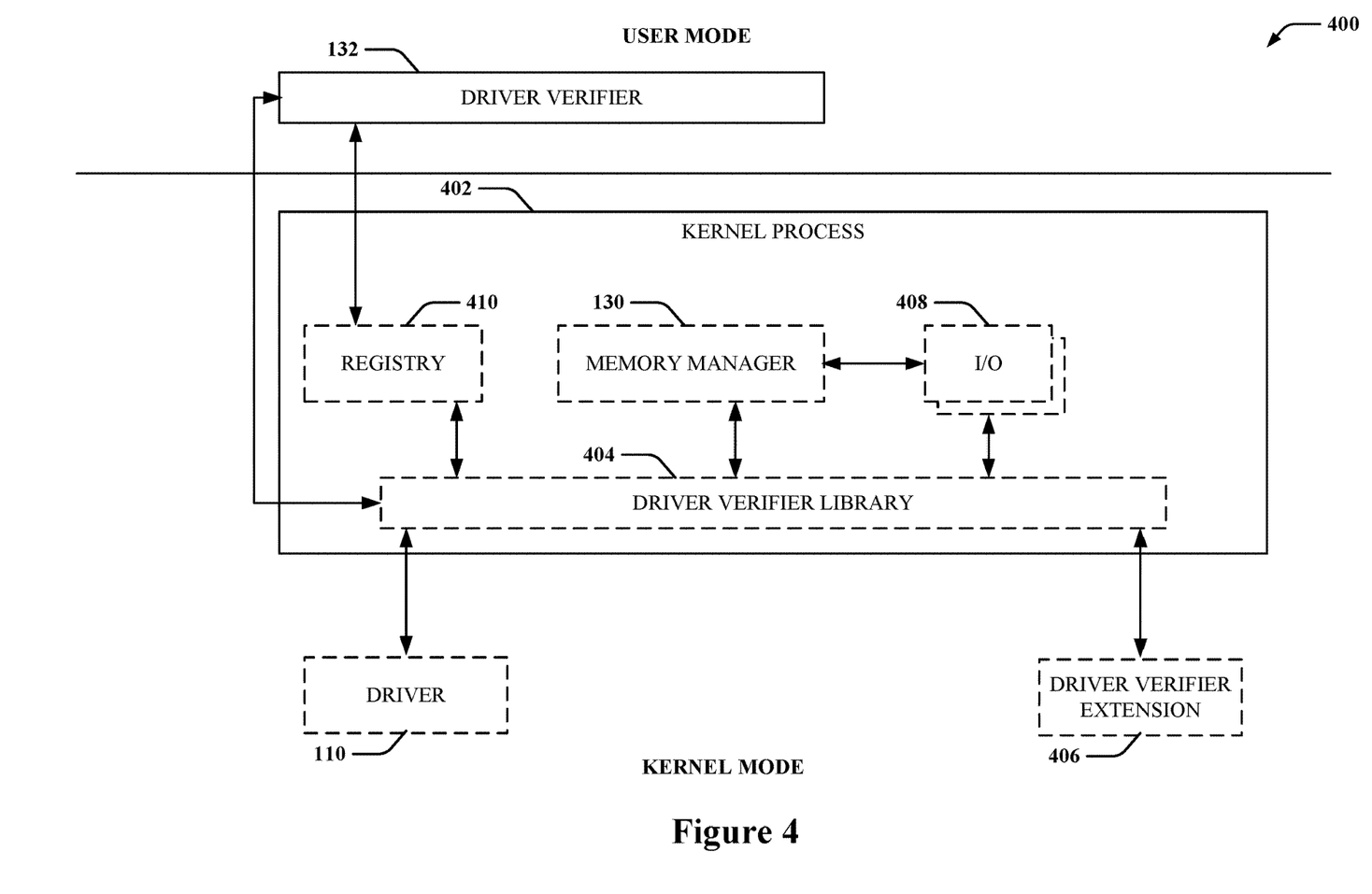
FIG. 4 is a schematic diagram of an example of a system operating on a processor to execute drivers and/or a driver verifier to collect information from the drivers, in accordance with aspects described herein.

FIG. 4 illustrates an example of a system 400 (e.g., an operating system or at least a portion thereof) operating on a processor to execute drivers and/or a driver verifier to collect information from the drivers, as described above. System 400 includes a driver verifier 132 that can communicate with a driver verifier library 404 executing in a kernel process 402 executing via the operating system. In an example, driver verifier 132, or an application portion thereof, may execute in a user mode. In addition, system 400 may have a kernel process 402 within which driver verifier library 404, memory manager 130, I/O portion 408, and registry 410 can operate. The driver verifier library 404 can operate to modify function calls by a driver 110 to instead use alternative function calls, as described above. For example, driver verifier 132, and/or driver verifier library 404, can be enabled via register 410 (e.g., upon boot up or other initialization of the system 400). In another example, driver verifier 132, and/or driver verifier library 404, can be enabled dynamically, as described herein, by or for using APT tool 120, etc.

In an example, driver verifier 132, operating in user mode, can write activation of the driver verifier library 404. Based on activation, the driver verifier library 404 can intercept the function calls and/or control the alternative function calls (e.g., to collect memory allocation or memory free parameters, as described above). Driver verifier library 404 can similarly intercept memory free instructions from memory manager 130, as described. In addition, driver verifier extension 406 can be or can include an extensible framework that can accommodate independently developed plugins, allowing the plugins to utilize the driver verifier library 404. In an example, APT tool 120 is an instance of such plugin extension utilizing driver verifier extension 406 to communicate with the driver verifier library 404.

Figure 5:
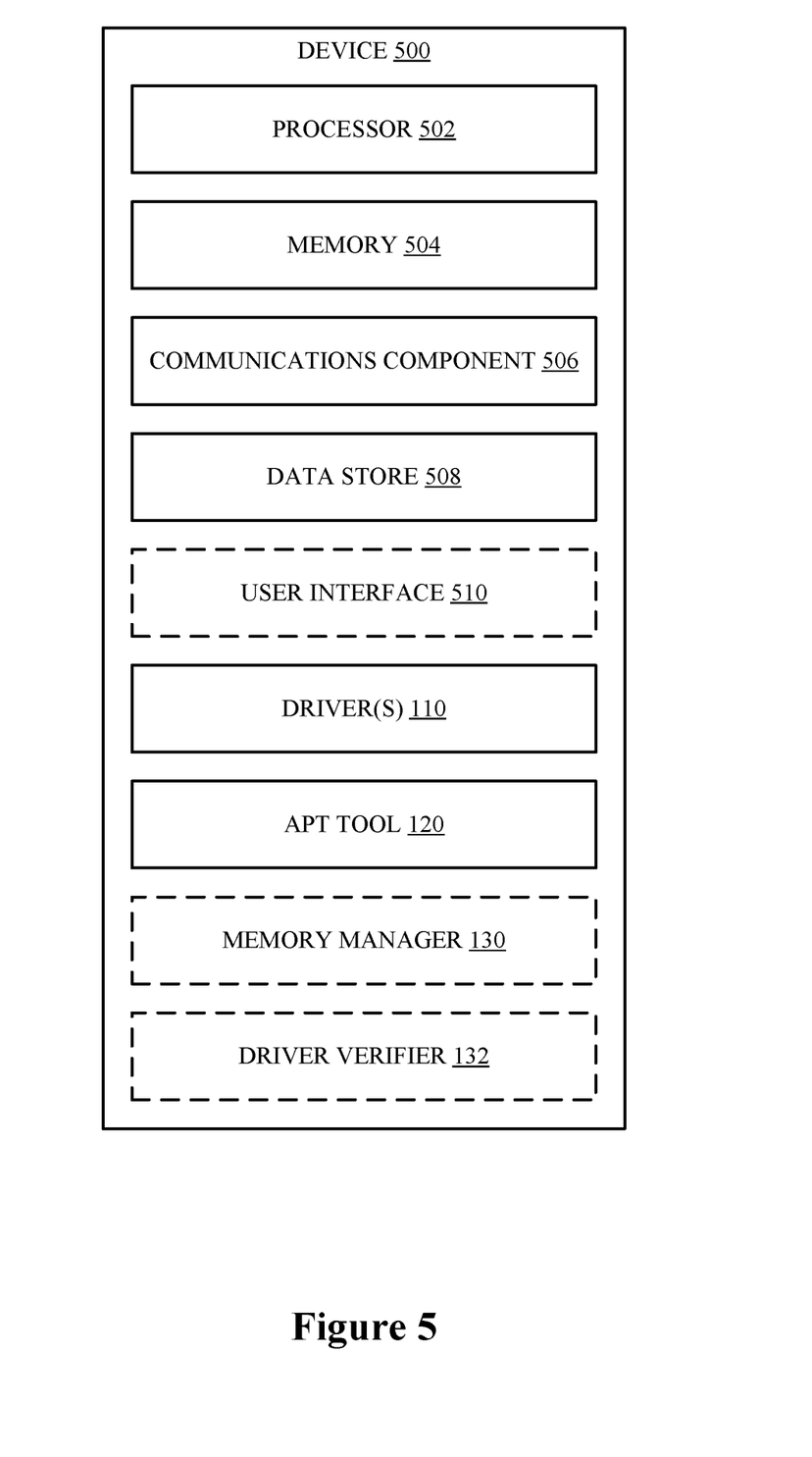
FIG. 5 is a schematic diagram of an example of a device for performing functions described herein, in accordance with aspects described herein.

FIG. 5 illustrates an example of device 500 including additional optional component details as those shown in FIG. 1. In one aspect, device 500 may include processor 502, which may be similar to processor 102 for carrying out processing functions associated with one or more of components and functions described herein. Processor 502 can include a single or multiple set of processors or multi-core processors. Moreover, processor 502 can be implemented as an integrated processing system and/or a distributed processing system.

Device 500 may further include memory 504, which may be similar to memory 104 such as for storing local versions of operating systems (or components thereof) and/or applications being executed by processor 502, such as drivers 110, APT tool 120, memory manager 130, driver verifier 132, etc., related instructions, parameters, etc. Memory 504 can include a type of memory usable by a computer, such as random access memory (RAM), read only memory (ROM), tapes, magnetic discs, optical discs, volatile memory, non-volatile memory, and any combination thereof.

Further, device 500 may include a communications component 506 that provides for establishing and maintaining communications with one or more other devices, parties, entities, etc. utilizing hardware, software, and services as described herein. Communications component 506 may carry communications between components on device 500, as well as between device 500 and external devices, such as devices located across a communications network and/or devices serially or locally connected to device 500. For example, communications component 506 may include one or more buses, and may further include transmit chain components and receive chain components associated with a wireless or wired transmitter and receiver, respectively, operable for interfacing with external devices.

Additionally, device 500 may include a data store 508, which can be any suitable combination of hardware and/or software, that provides for mass storage of information, databases, and programs employed in connection with aspects described herein. For example, data store 508 may be or may include a data repository for operating systems (or components thereof), applications, related parameters, etc.) not currently being executed by processor 502. In addition, data store 508 may be a data repository for drivers 110, APT tool 120, memory manager 130, driver verifier 132, and/or one or more other components of the device 500.

Device 500 may optionally include a user interface component 510 operable to receive inputs from a user of device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof.

Device 500 may additionally include drivers 110 for allowing communications with hardware or other devices, APT tool 120 for tracking memory usage by one or more drivers 110, memory manager 130 for freeing memory used by (or allocating memory to) one or more drivers 110, driver verifier 132 for intercepting functions called by one or more drivers 110 to use alternative functions that allow for recording certain data, etc., as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for tracking memory usage of a driver, comprising:
    tracing, in a kernel mode of an operating system, a memory allocation request related to the driver to allocate a portion of memory for the driver, wherein tracing the memory allocation request includes replacing a first function call for the memory allocation request with a second function call provided by a driver verifier to initiate the memory allocation request to the driver verifier, wherein tracing the memory allocation request is performed by the driver verifier;
    recording, based on tracing the memory allocation request, one or more allocation parameters indicated by the memory allocation request; and
    reporting, during execution of the driver and based on the one or more allocation parameters indicated by the memory allocation request and via an interface on an application, an allocation history of the driver over a period of time.

2. The computer-implemented method of claim 1, further comprising:
    tracing, in the kernel mode of the operating system, a memory free related to the driver to free the portion of memory for the driver; and
    recording, based on tracing the memory free, one or more free parameters of the memory free,
    wherein reporting the allocation history of the driver over the period of time is further based on the one or more free parameters.

3. The computer-implemented method of claim 2, wherein the memory free is traced from a pool manager of the operating system.

4. The computer-implemented method of claim 2, wherein the allocation history includes at least an allocation count of a number of allocations requested by the driver over the period of time, an amount of memory allocated by the driver over the period of time, a number of memory frees related to the driver over the period of time, and an amount of memory freed by the driver over the period of time.

5. The computer-implemented method of claim 1, further comprising detecting, during execution of the driver, one or more memory allocation requests by the driver without a corresponding memory free, wherein reporting the allocation history includes reporting an indication of the one or more memory allocation requests.

6. The computer-implemented method of claim 1, wherein reporting the allocation history of the driver over the period of time is part of generating multiple snapshots of the allocation history the driver over multiple periods of time.

7. The computer-implemented method of claim 6, further comprising:
    detecting, during the execution of the driver and based on the multiple snapshots, a pattern of memory allocation requests, including the memory allocation request, traced from the driver without corresponding memory frees over the period of time;
    determining that the pattern indicates a potential memory leak; and
    reporting an indication of the potential memory leak.

8. The computer-implemented method of claim 7, wherein reporting the indication of the potential memory leak includes reporting the one or more allocation parameters of at least two of the multiple snapshots that correspond to the pattern that indicates the potential memory leak.

9. The computer-implemented method of claim 1, wherein replacing the first function call with the second function call includes modifying an import address table (IAT) to replace the first function call with the second function call.

10. A device for tracking memory usage of a driver, comprising:
    a memory storing one or more parameters or instructions for executing an operating system and the driver that facilitates communicating with hardware or other devices; and
    at least one processor coupled to the memory, wherein the at least one processor is configured to:

trace, in a kernel mode of the operating system, a memory allocation request related to the driver to allocate a portion of memory for the driver, wherein the at least one processor is configured to trace the memory allocation request at least in part by replacing a first function call for the memory allocation request with a second function call provided by a driver verifier to initiate the memory allocation request to the driver verifier, wherein tracing the memory allocation request is performed by the driver verifier;

record, based on tracing the memory allocation request, one or more allocation parameters indicated by the memory allocation request; and report, during execution of the driver and based on the one or more allocation parameters indicated by the memory allocation request and via an interface on an application, an allocation history of the driver over a period of time.

11. The device of claim 10, wherein the at least one processor is further configured to:

trace, in the kernel mode of the operating system, a memory free related to the driver to free the portion of memory for the driver; and record, based on tracing the memory free, one or more free parameters of the memory free, wherein reporting the allocation history of the driver over the period of time is further based on the one or more free parameters.

12. The device of claim 11, wherein the memory free is traced from a pool manager of the operating system.

13. The device of claim 11, wherein the allocation history includes at least an allocation count of a number of allocations requested by the driver over the period of time, an amount of memory allocated by the driver over the period of time, a number of memory frees related to the driver over the period of time, and an amount of memory freed by the driver over the period of time.

14. The device of claim 10, wherein the at least one processor is further configured to detect, during execution of the driver, one or more memory allocation requests by the driver without a corresponding memory free, wherein the at least one processor is configured to report the allocation history including an indication of the one or more memory allocation requests.

15. The device of claim 10, wherein the at least one processor is configured to report the allocation history of the driver over the period of time including generating multiple snapshots of the allocation history the driver over multiple periods of time.

16. The device of claim 15, wherein the at least one processor is further configured to:

detect, during the execution of the driver and based on the multiple snapshots, a pattern of memory allocation requests, including the memory allocation request, traced from the driver without corresponding memory frees over the period of time;

determine that the pattern indicates a potential memory leak; and report an indication of the potential memory leak.

17. A computer-readable medium, comprising code executable by one or more processors for tracking memory usage of a driver, wherein the computer-readable medium is one of a memory or a storage device, the code comprising code for:

tracing, in a kernel mode of an operating system, a memory allocation request related to the driver to allocate a portion of memory for the driver, wherein tracing the memory allocation request includes replacing a first function call for the memory allocation request with a second function call provided by a driver verifier to initiate the memory allocation request to the driver verifier, wherein tracing the memory allocation request is performed by the driver verifier;

recording, based on tracing the memory allocation request, one or more allocation parameters indicated by the memory allocation request; and reporting, during execution of the driver and based on the one or more allocation parameters indicated by the memory allocation request and via an interface on an application, an allocation history of the driver over a period of time.

18. The computer-readable medium of claim 17, further comprising code for:

tracing, in the kernel mode of the operating system, a memory free related to the driver to free the portion of memory for the driver; and recording, based on tracing the memory free, one or more free parameters of the memory free, wherein the code for reporting reports the allocation history of the driver over the period of time is further based on the one or more free parameters.

* * * * *